UNITED STATES PATENT OFFICE 2,502,421

TETRAHYDROTHIOPHENES

Lee C. Cheney and John Robert Piening, Detroit, Mich., assignors to Parke, Davis & Company, Detroit, Mich., a corporation of Michigan No Drawing. Application August 28, 1944, Serial No. 551,619

4 Claims. (Cl. 260—329)

This invention relates to 4-carboalkoxy-3-keto-2-alkyl-tetrahydrothiophenes having the general formula,

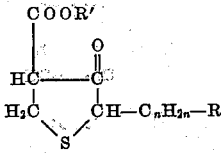

wherein R' is a lower saturated alkyl residue, either straight or branched chain; $n$ has one of the values 1 to 8 inclusive, wherein the aliphatic carbon chain, —$C_nH_{2n}$—, may be either straight or branched; and R is a radical of the class —COOR', aryloxy, aralkoxy and alkoxy. The invention also encompasses methods for obtaining these new compounds.

The compounds of the invention are useful for the preparation of compositions possessing valuable therapeutic properties. They are particularly useful as intermediates for the synthesis of compounds possessing biotin activity and possibly anti-biotin activity.

According to this invention, 4-carboalkyloxy-3-keto-2-alkyl-tetrahydrothiophenes of the above type are obtained by an internal condensation within a β-carboalkoxyalkyl-α-carboalkoxyalkyl sulfide, wherein the alkyl carrying the α-carboalkoxy group also carries the substituent R. A condensation of this type, wherein the functional group R is present and has one of the values given, has never previously been carried out. Moreover, there was no way of knowing that the condensation would occur without alteration of R at the same time.

The condensation may be indicated as follows,

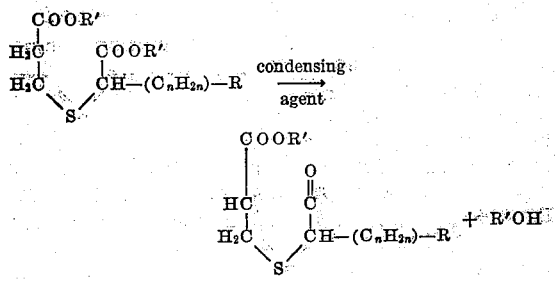

wherein R, R' and $n$ have the values already given. The condensing agent may be R'OM', M', M'NH₂, and (C₆H₅)₃CM', where M' is an alkali metal, or R''—MgX where R'' is an aryl or an alkyl group and X is Cl, Br or I.

In carrying out the condensation reaction, we prefer to employ for the condensing agents the above mentioned R'OM' compounds and especially the sodium alkoxide that corresponds to the alcohol portion of the ester. We have also found that there is some advantage in using two moles of sodium alkoxide per mole of ester to be cyclized. Nevertheless, good results are obtained with only one mole of condensing agent per mole of ester. Condensing agents, other than the alkali metal alkoxides, which may be used for the cyclization include alkali metals (such as finely divided sodium and metallic potassium), alkali metal amides (such as sodamide), and organometallic combinations such as triphenylmethylsodium and mesitylmagnesium bromide.

Although we prefer to employ dry benzene as a solvent in the ratio of about 2 liters of benzene per mole of ester when conducting this cyclization, other solvents may be used, including dry ether, toluene, xylene and dioxane. In general, any dry hydrocarbon or ether thereof which is liquid may be used as a reaction medium or solvent. The presence of a relatively large volume of solvent generally favors the intramolecular cyclization. On the other hand, the reaction may be carried out without a diluent by using an alkali alkoxide as the condensing agent and by distilling the alcohol as rapidly as it is formed in the reaction.

The cyclization generally goes to completion without the application of heat, but in some cases it is advisable to use heat. Atlhough we prefer to use an atmosphere of nitrogen for the preparation of the alkali alkoxides and for conducting the reaction, satisfactory results may be obtained without exercising this precaution.

We prefer to purify the cyclic thio-ether β-keto esters disclosed in this invention through the preparation of their copper chelate derivatives. Regeneration of the β-keto esters from the copper derivatives is readily accomplished by treatment with dilute mineral acid. These purified keto esters are soluble in strong alkali and their alcoholic solutions are colored red or purple by a solution of ferric chloride. In the presence of an acid-binding agent they yield oximes when treated with hydroxylamine hydrochloride.

The invention is illustrated by the following examples.

*Example 1.—Ethyl 4-carbethoxy-3-keto-2-tetrahydrothiophenevalerate*

The alcohol is removed from a solution of 5.13 g. (0.223 gram atom) of sodium in 80 ml. of absolute alcohol. The dry sodium ethoxide is kept under nitrogen while lumps are broken up and then is covered with 200 ml. of dry benzene. A solution of 38.8 g. (0.1115 mole) of β-carbethoxyethyl α, ω-dicarbethoxyamyl sulfide in 50 ml. of dry benzene is added in two portions. The mixture is shaken and cooled when it becomes warm. The sodium ethoxide goes into solution very readily but after several minutes the sodium derivative of the keto ester separates. The mixture is allowed to stand overnight.

The cooled mixture is acidified with a solution of 20 ml. of glacial acetic acid in 160 ml. of water. Layers are separated and the benzene layer is extracted twice with sodium bicarbonate solution, is washed with saturated sodium chloride solution and dried over sodium sulfate. Benzene is removed leaving a light brown oil which gives a cherry-red ferric chloride test and forms a green copper salt when shaken with copper acetate solution.

The keto ester is purified through the copper salt which weighs 33.3 g. A recrystallized sample melts at 118–119°.

Anal.—Calcd. for $(C_{14}H_{22}O_5S)_2Cu$: C, 50.32; H, 6.63; Cu, 9.51. Found: C, 50.76; H, 6.56; Cu, 9.70.

The keto ester is regenerated by shaking an ether solution of the copper salt with 10% sulfuric acid. The ether layer is washed with sodium bicarbonate solution and dried over sodium sulfate. Ether and salt are removed leaving 30 g. of keto ester as a dark red oil which lightens to a yellow color on long standing; yield 89%.

Anal.—Calcd. for $C_{14}H_{22}O_5S$: C, 55.60; H, 7.33. Found: C, 55.53; H, 7.36.

Its formula and its production from the starting material may be represented as follows:

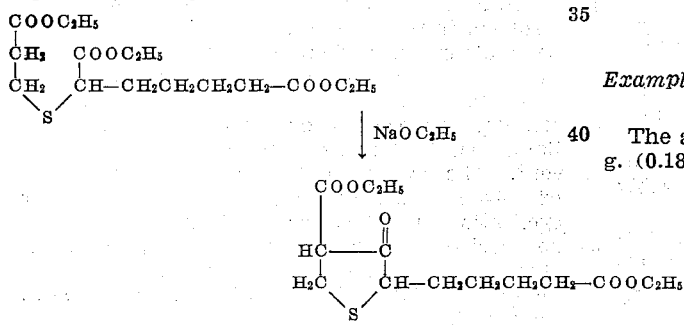

Example 2.—4-carbethoxy-3-keto-2-γ-phenoxypropyltetrahydrothiophene

The alcohol from a solution of 30.5 g. (1.328 moles) of sodium in 590 ml. of absolute alcohol is removed at reduced pressure until the NaOEt is completely dry (160–200° C. at 23 mm. for two hours). The NaOEt is suspended in dry benzene (900 ml.) and treated with 235 g. (0.664 mole) of β-carbethoxyethyl-α-carbethoxy-d-phenoxybutyl sulfide in 300 ml. of dry benzene. After shaking thoroughly the solution is allowed to stand overnight. The cooled solution is acidified with 147 ml. of glacial acetic acid in 1200 ml. of water. Benzene layer is separated. Water layer is treated with 5 ml. of concentrated HCl and extracted 3 times with benzene. The extracts and benzene layer are washed three times with bicarbonate solution, twice with water and clarified with Na2SO4. Benzene is removed through column leaving a residue of 180 g. A similar run is made using 190 g. of ester. The residue in this case amounts to 155 g. The bicarbonate extracts from both runs are acidified and combined, then extracted with benzene. After washing benzene extract with water, it is removed through a column leaving a residue of about 33 g. This residue gives a FeCl3 test, green turning to blue then disappearing rapidly. It solidified on standing. To purify the keto ester, it is converted to the Cu salt by adding an ether solution of the ester to a solution of 121.2 g. (0.60 mole) of Cu(Ac)2 in 1800 ml. of H2O. The mixture is shaken vigorously after each addition of ester. A dark green waxy precipitate forms. This is filtered and washed with water, alcohol and petroleum ether. The green product is regenerated by shaking it with a solution of 56 ml. of H2SO4 in 1000 ml. of H2O and covered with 1 l. of ether. The ether layer is separated. The water layer is extracted twice with ether, combined ether layers are washed with water, NaHCO3 solution (10%), water and dried over Na2SO4. After filtration, the ether is removed through a column leaving a residue of 123 g. of fairly pure keto ester. The second run is treated similarly and gives 85 g. of fairly pure keto ester. Fifteen grams of the keto ester are made into the Cu salt. This salt is recrystallized four times from benzene and digested with alcohol. A sample is submitted for analysis.

Anal.—Calcd. for $CuC_{32}H_{38}O_8S_2$: C, 56.65; H, 5.65; Cu, 9.39. Found: C, 56.73; H, 5.97; Cu, 9.56.

This Cu salt is again regenerated into keto ester in the usual manner and submitted for analysis.

Anal.—Calcd. for $C_{16}H_{20}O_4S$: C, 62.31; H, 6.53. Found: C, 62.53; H, 6.85.

The formula of the keto ester is

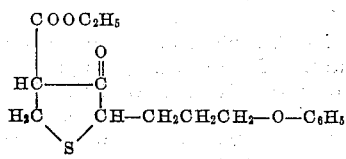

Example 3.—4-carbethoxy-3-keto-2-γ-benzyloxypropyltetrahydrothiophene

The alcohol is removed from a solution of 4.35 g. (0.189 mole) of sodium in 70 ml. of absolute alcohol. The dry NaOEt is kept under an atmosphere of N2 while lumps are broken up and 100 ml. of dry benzene is added. To this suspension is added 34.8 g. (0.0945 mole) of β-carbethoxyethyl-α-carbethoxy-Δ-benzyloxybutyl sulfide (B. P. 200–216° C./2 mm.) dissolved in 50 ml. of dry benzene. The whole is shaken thoroughly, keeping N2 present at all times. The reaction becomes warm so it is cooled in water. The dark brown solution is allowed to stand overnight at room temperature. To the cooled solution is added 20 ml. of glacial acetic acid dissolved in 160 ml. of water. The layers are separated, the water layer is extracted twice with benzene. The benzene fractions are combined, washed with water, twice with NaHCO3 solution, and once with saturated NaCl solution, then dried over Na2SO4. Benzene is removed through a short column, first by distillation at atmospheric pressure, then at reduced pressure. The residue weighs 26.44 g. and gives a red coloration with FeCl3. It forms a Cu salt with Cu(AC)2 solution. The keto ester is purified through the copper salt by shaking small portions of the ester with a saturated solution of Cu(Ac)2.H2O in water. The dark green salt is soluble in ether so it is extracted from the water phase with this solvent. Evaporation of the ether and addition of petroleum ether and then stirring produce a light green crystalline compound. The product is collected in a Buchner funnel, is washed with water until free of $Cu(Ac)_2$ and acetic acid, then is dried in a vacuum desiccator over $P_2O_5$. Weight 23.5 g. A portion of the salt is recrystallized several times from 95% alcohol to constant M. P. of 107–108° C. with softening at 105° C.

*Anal.*—Calcd. for $C_{34}H_{44}O_8S_2Cu$: C, 57.64; H, 6.26; Cu, 8.97. Found: C, 57.55; H, 6.04; Cu, 9.10.

The keto ester is regenerated by shaking the ether solution of the salt with a solution of 5 ml. of $H_2SO_4$ in 80 ml. of water. The blue water phase is removed and the ether layer is washed once with water, once with 10% $NaHCO_3$ solution, once with saturated NaCl solution, then dried over $Na_2SO_4$ overnight. Removal of the salt and ether leaves 20.4 g. of keto ester, yield 69%. An analysis is made on this compound.

*Anal.*—Calcd. for $C_{17}H_{22}O_4S$: C, 63.32; H, 6.87. Found: C, 63.41; H, 6.61.

The formula of the keto ester is

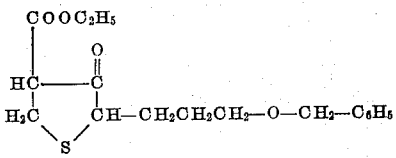

The examples given above are for purposes of illustrating the invention only. In its broader aspects, the invention is not limited to the specific compounds and conditions given in the examples and numerous variations therefrom, which are nevertheless within the scope of the invention, will occur to those skilled in the art.

The $\beta$ - carboalkoxyalkyl - $\alpha$ - carboalkoxyalkyl sulfides used as starting materials for the present invention can be prepared as described in our Patent No. 2,468,426; issued April 26, 1949.

What we claim as our invention is:

1. 4 - carboethoxy - 3 - keto - 2 - $\gamma$ - phenoxy - propyltetrahydrothiophene of formula,

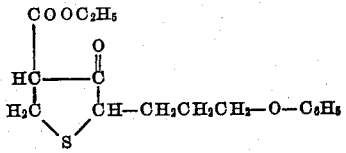

2. 4 - carboethoxy - 3 - keto - 2 - $\gamma$ - benzyl - oxypropyltetrahydrothiophene of formula,

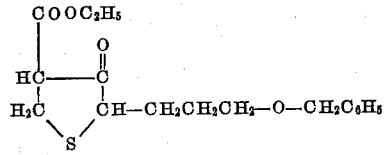

3. In a process for the preparation of a 4 - carboalkoxy - 3 - keto - 2 - alkyl - tetrahydrothiophene through internal condensation of a $\beta$-carboalkoxyalkyl-$\alpha$-carboalkoxyalkyl sulfide by means of an alkaline condensing agent, the steps consisting of purifying the 4-carboalkoxy-3-keto-2-alkyl-tetrahydrothiophene by converting it to its copper chelate derivative, crystallizing said chelate derivative from a solvent in order to separate it from impurities soluble in said solvent, and regenerating the said thiophene by treating the crystalline chelate derivative with dilute mineral acid.

4. The steps comprising adding an ether solution of a 4-carboalkoxy-3-keto-2-alkyl-tetrahydrothiophene to an aqueous solution of a copper salt, thereby converting it to its copper chelate derivative, crystallizing said chelate derivative from benzene and regenerating said thiophene with dilute mineral acid.

LEE C. CHENEY.
JOHN ROBERT PIENING.

REFERENCES CITED

The following references are of record in the file of this patent:

UNITED STATES PATENTS

| Number | Name | Date |
| --- | --- | --- |
| 2,424,007 | Moore et al. | July 15, 1947 |

OTHER REFERENCES

Schmid: Helv. Chim., Acta, vol. 27, 128, 130 (1944).